No. 805,849. PATENTED NOV. 28, 1905.
H. K. GILBERT.
CAR REPLACER.
APPLICATION FILED NOV. 1, 1904.
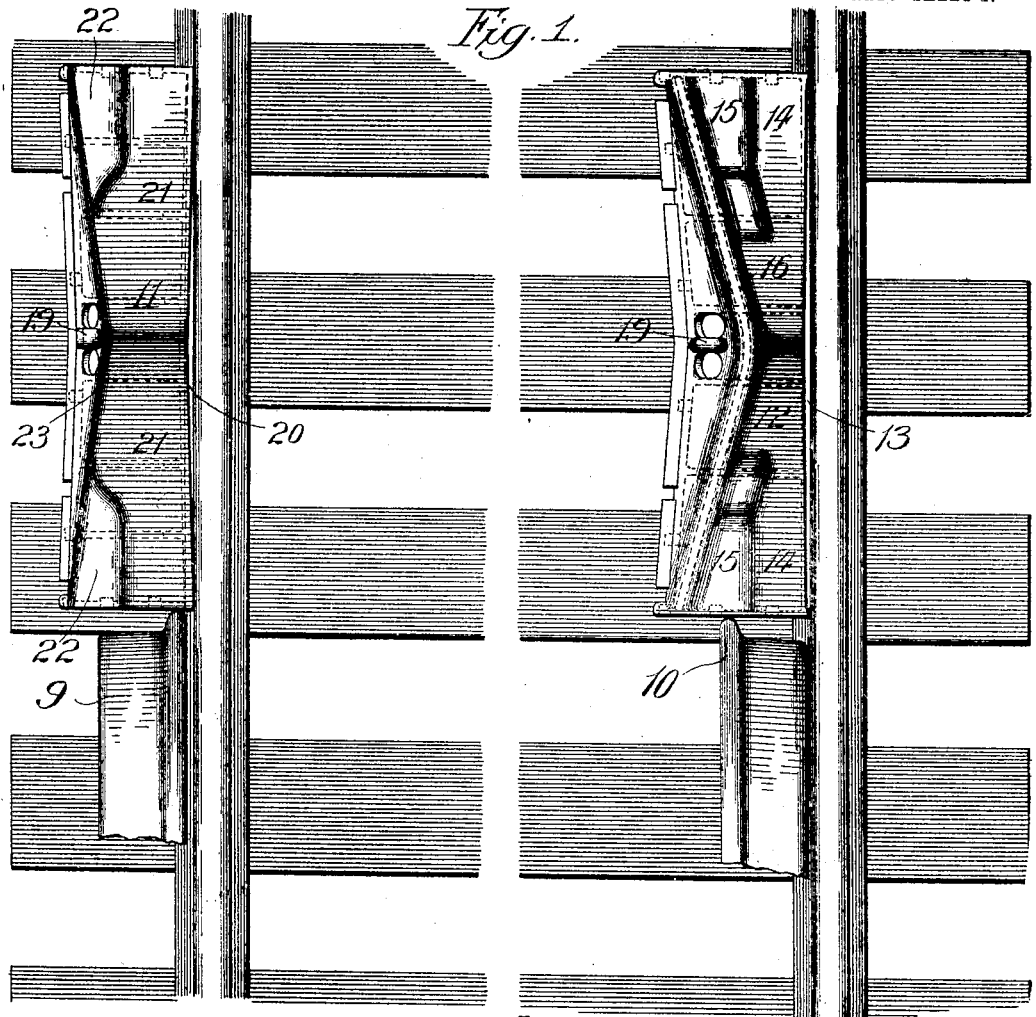
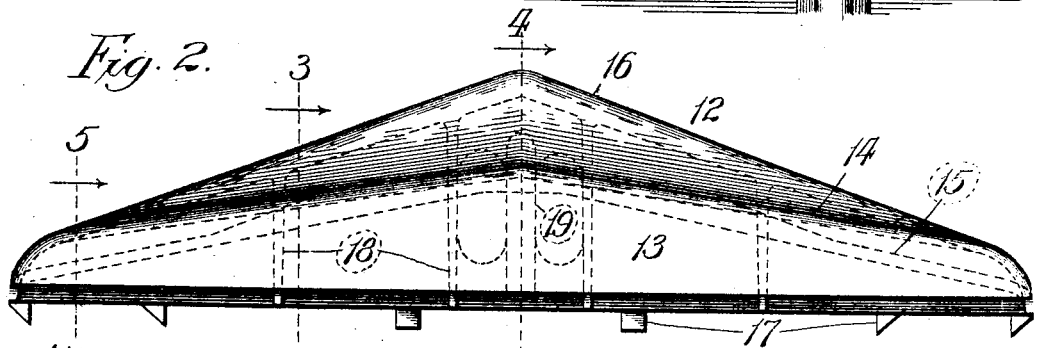

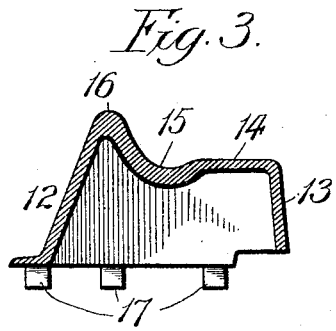
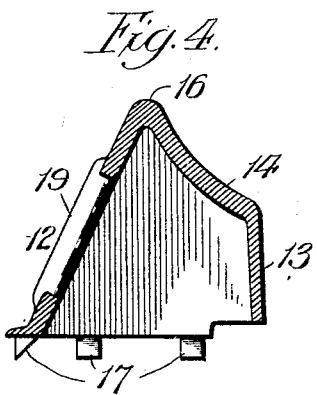
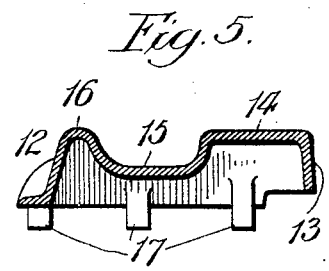
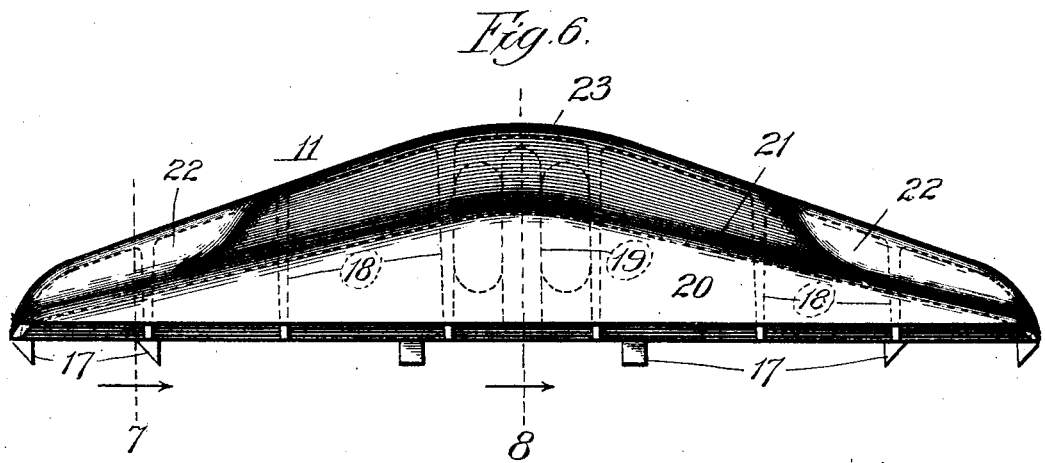
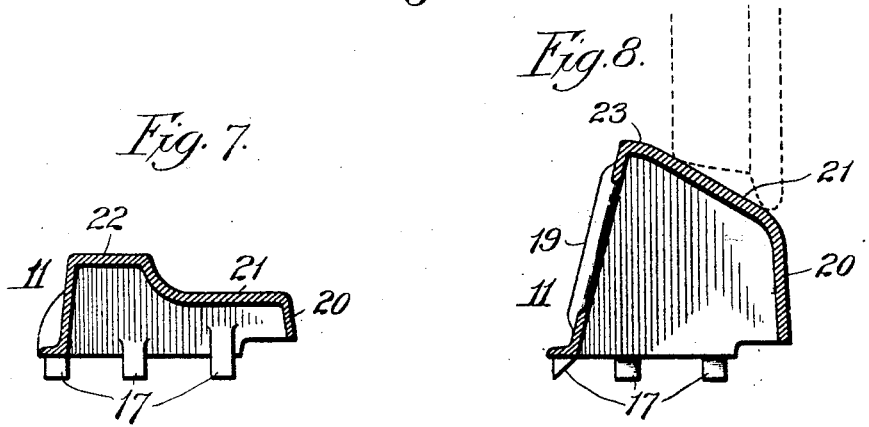
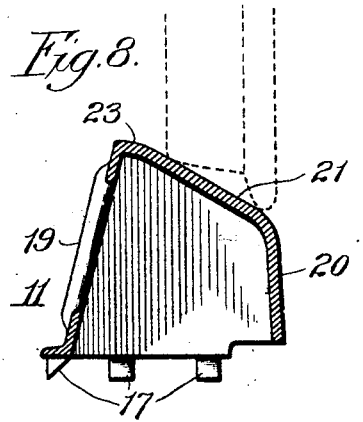

UNITED STATES PATENT OFFICE.

HENRY K. GILBERT, OF CHICAGO, ILLINOIS.

CAR-REPLACER.

No. 805,849.      Specification of Letters Patent.      Patented Nov. 28, 1905.

Application filed November 1, 1904. Serial No. 230,914.

*To all whom it may concern:*

Be it known that I, HENRY K. GILBERT, a citizen of the United States, residing at Chicago, in the State of Illinois, have invented certain new and useful Improvements in Car-Replacers, of which the following is a specification.

My invention relates to means for replacing the wheels of derailed cars and the like, and particularly to the construction of the operating surfaces of such replacers, or wrecking frogs; the primary objects of the invention being to provide for engaging both the flange and tread of the wheel, on first engagement; to provide against injury to the wheel or displacing the frog in using; to facilitate the raising of the wheel thereon; to provide convenient means of handling and placing the frog, and to generally improve its efficiency. These objects, and other advantages to hereinafter appear, I attain by means of the construction illustrated in preferred forms in the accompanying drawing, wherein—

Figure 1 is a plan view of a portion of railway track showing the complementary pair of replacers designed according to my invention, in position to replace derailed wheels;

Figure 2 is a side elevation, taken on the rail side, of the right hand replacer or frog shown in Figure 1, being the one designed to raise the wheel which is inside the track;

Figures 3, 4, and 5, are vertical cross sections respectively on the lines (3), (4), and (5), in Figure 2;

Figure 6 is a side elevation, taken on the rail side, of the left hand replacer shown in Figure 1, being the one engaging the wheel which is on the outside of the track, and Figures 7 and 8 are respectively cross sections taken on the lines (7) and (8) in Figure 6.

From the different conditions to be met, the two co-operating members of the pair of replacers are of somewhat different shape, but they are alike in that they are both of general wedge shape on both sides and both have means on the surface for engaging both the flange and the tread of the wheel as it first starts up the incline, and in both the surface is modified toward the top in order to relieve the tread in one case and the flange in the other case of contact with the surface, so that the wheel may slide off on to the rail when it has been sufficiently elevated. Considering first the right hand frog shown in Figures 1 to 5 it will be seen that it is made preferably of a single casting having the strengthening ribs 18 running across, and the holding teeth 17 at the bottom. The casting has a face 13 which at the top has a rounded corner and continues as the top flat face 14 running from end to end, and inclined both ways. At the beginning of the incline, as shown in Figures 2, 3, 4, and 5, it will be seen that the portion 14 will engage only the tread of the wheel before the flange touches, and there is a depressed groove 15 which allows of the entry of the flange so that the approach to the incline is gradual and the flange does not immediately engage; both the flange and tread are then engaged; but the groove 15 ends about half way up the incline and then the surface 14 makes a backward curve which gradually ends in the steep face of ridge 16 which is elevated as shown at Figure 4 to such an inclination as to cause the flange of the wheel to slide off down the surface to the rail. The surface upon which the flange operates has a dip or concave form all the way up the surface, but it will be seen that it is formed to engage at first the tread, then flange and tread, and lastly only the flange, the tread hump disappearing from the surface. This prevents the flange from being chipped, or the frog being indented, by a blow of the flange. On the inner side, as shown in Figures 2 and 4, it will be seen that I have provided a pair of openings between which is the raised rib 19 serving as a handle to lift and move the frog, and this is so placed as to balance the weight and make it easy to carry or manipulate.

The complementary part of the replacer, for the outside of the rail, is shown at the left of Figure 1 and in detail in Figures 6 to 8. It is of the same general form as the first frog, having a flat face 20 near the rail, an inclined face 21, with a rounded sloping surface at the middle, and ending in the top ridge 23; but at the two ends of the incline there are raised flat portions 22 which continue gradually and join with the inclined ridge 23, but end by merging with surface 21 about half way up the incline so that as the wheel approaches the top of the incline the flange alone engages the surface and the tread is relieved of contact and the wheel may readily slide off the frog to its place on the rail, when raised to the proper height. This member of the pair of replacers also is provided with the teeth 17 to prevent displacement, and with the carrying handle 19 placed so as to conveniently manipulate the frog and to carry it by its center of gravity.

It will be seen that by this construction the wheel upon first engaging the replacer first strikes the tread, then gradually the flange and tread together, and afterward rests upon the flange alone, and that it thus provides an easy and safe approach to the proper position upon the top of the frog to be automatically slid off of the frog on to the rail, when properly elevated.

Having thus described my invention and illustrated its use, what I claim as new, and desire to secure by Letters Patent, is—

1. A car replacer comprising a casting in the form of a double-ended wedge or incline, each end of the incline having a continuous surface to engage the flange of the wheel and a partial bulge at the beginning of the incline to engage the tread of the wheel before contact with the flange, and the surface gradually altering in shape toward the apex where there is a steep incline and continuous surface from the apex to the rail.

2. A car replacer comprising a casting having a double wedge form, each end of the wedge having an incline with a surface to engage the flange of the wheel but with a short portion of the surface being raised to engage the tread only of the wheel, and the apex of the wedge being a continuous slanting surface to allow of freely sliding the flange on to the rail after it has been elevated, substantially as described.

3. In a car replacer a member comprising an integral casting having the stiffening ribs 18 and the tooth lugs 17 and a surface comprising the vertical sides 13, the compound curved hollow surface 14, and the apex 16, substantially as described, formed to engage the wheel first on the tread only then upon both the tread and flange and near the apex to engage only the flange, as the wheel is rolled up on the casting.

4. A car replacer comprising a shell having a double wedge incline and provided with a handle on the side formed by a rib intervening between two slots formed in the side, substantially as described.

In testimony whereof I have hereunder signed my name in the presence of the two subscribed witnesses.

HENRY K. GILBERT.

Witnesses:
 PAUL CARPENTER,
 ALBERT G. MILLER.